(12) United States Patent
Wolter

(10) Patent No.: US 9,965,116 B1
(45) Date of Patent: May 8, 2018

(54) TACTILE OVERLAY FOR TOUCHSCREEN DEVICE

(71) Applicant: Square, Inc., San Francisco, CA (US)

(72) Inventor: Jonathan Andrew Wolter, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days. days.

(21) Appl. No.: 14/799,412

(22) Filed: Jul. 14, 2015

(51) Int. Cl.
*G06F 3/044* (2006.01)
*G06Q 20/20* (2012.01)

(52) U.S. Cl.
CPC ............ *G06F 3/044* (2013.01); *G06Q 20/20* (2013.01)

(58) Field of Classification Search
CPC ........ G06F 1/1624; G06F 1/1662; G06F 3/02; G06F 3/0238; G06F 3/03547; G06F 3/041; G06F 3/0412; G06F 3/0414; G06F 3/046; G06F 3/047; G06F 2203/041; G06F 3/044; G06F 2203/04107; G06F 2203/04111; G06F 2203/04112; G06F 3/033; G06F 3/03545; G06F 2203/04101; G06F 3/0317; G06F 3/03542; G06F 3/0386; G06F 3/0312; G06F 3/03543; G06F 3/03548; G06F 3/0362; G06F 3/04847; G06Q 20/20
See application file for complete search history.

(56) References Cited

U.S. PATENT DOCUMENTS

| 7,453,442 | B1* | 11/2008 | Poynter | G06F 3/04886 345/168 |
| 2003/0098803 | A1* | 5/2003 | Gourgey | G06F 3/04886 341/21 |
| 2005/0030296 | A1* | 2/2005 | Stohrer | G03G 15/5016 345/173 |
| 2006/0256090 | A1* | 11/2006 | Huppi | A63F 13/02 345/173 |
| 2010/0026635 | A1* | 2/2010 | Dimitrov | G06F 3/0202 345/173 |
| 2011/0184824 | A1* | 7/2011 | George | G01D 5/39 705/24 |

(Continued)

OTHER PUBLICATIONS

Speed Dots, "Frequently Asked Questions," speeddots.com (Available online at http://www.speeddots.com/faq.php, last visited Jul. 14, 2015).

*Primary Examiner* — Olga Merkoulova
*Assistant Examiner* — Jarurat Suteerawongsa
(74) *Attorney, Agent, or Firm* — Polsinelli PC

(57) ABSTRACT

A system for facilitating engagement with a touch screen by a visually impaired person comprises an overlay. The overlay includes a bottom surface having a capacitive component and an overlay locating element. The overlay locating element is configured to interface with a touch screen underlying the overlay to provide a position of the overlay relative to the touch screen. A top surface of the overlay includes a tactile button that is located opposite of the capacitive component. The tactile button and the capacitive component are above the region of a displayed soft button. Engagement of the tactile button by the visually impaired person results in the capacitive component interacting with the touch screen in the region of the displayed soft button to provide a capacitive input detectable by the touch screen.

20 Claims, 12 Drawing Sheets

(56) References Cited

U.S. PATENT DOCUMENTS

2011/0215914 A1* 9/2011 Edwards ............... G06F 3/041
340/407.2
2011/0248947 A1* 10/2011 Krahenbuhl .......... G06F 1/1626
345/174

* cited by examiner

TACTILE OVERLAY FOR TOUCHSCREEN DEVICE

BACKGROUND

Consumers can interact with merchants to conduct various financial payment transactions. For example, a consumer can conduct a transaction with a merchant at a point-of-sale system using cash, a transaction card, or other transaction object. Many point-of-sale systems include a computing device having a touch-screen or other flat surface. A display or other device having a flat surface may be difficult for a visually impaired person to use. Further, the flat surface lacks any edges or ridges or other ability to aide a user in using the device.

BRIEF DESCRIPTION OF THE DRAWINGS

In order to describe the manner in which features of the disclosure can be obtained, a more particular description of the principles will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Figure 1:
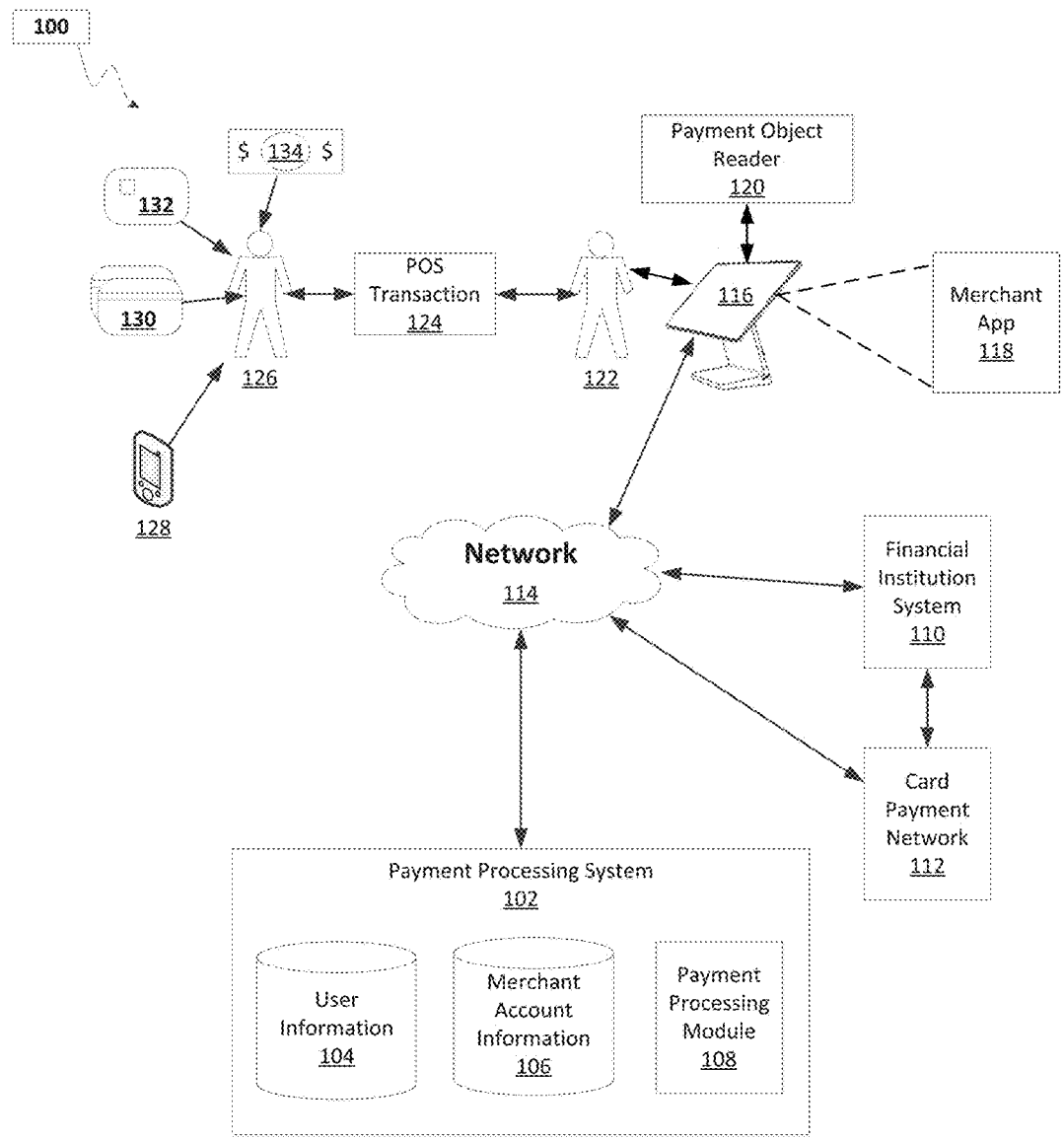
FIG. 1 illustrates an example architecture of a payment communication system for enabling transactions between merchants and buyers.

System, devices, methods, and non-transitory computer-readable media are disclosed in accordance with various embodiments of the present disclosure overcome one or more of the above-referenced and other deficiencies in conventional approaches to point of sale systems. In particular, in accordance with various embodiments, approaches provide for a payment object reader that is used in performing a payment transaction at a point-of-sale system.

An overlay for a computing device can be used to assist a visually impaired, or otherwise impaired, individual in using the device. By providing an overlay, tactile or other feedback can be provided to the user to improve the ease of use. As such, the overlay buttons provided on the overlay are able to provide feedback to the user, where the overlay buttons represent soft buttons displayed on the touch screen device, in a region underneath the overlay buttons. By providing overlay buttons, a user is able to receive some sort of feedback from the computing device, confirming selection of a soft button. Further, a user is able to discern the buttons from each other through the tactile feedback provided by the overlay. The improved functionality assists all users of the computing device, and not only those having visual impartments, by providing an overlay button where an otherwise soft button would exist. The overlay is also useful for non-visually impaired persons with limited or limited visual access to a pin pad, such as when a shroud covers some of the pin pad for security purposes.

The overlay buttons provided on the overlay can be traditional push-button switches, cut-outs in the overlay, cut-outs having a depressed or raised donut around an edge of the cut-out, raisings in the overlay, or capacitive-sensing touch buttons, etc. The capacitive-sensing touch buttons are buttons that detect a change in capacitance, such as that induced by a finger or other object having a capacitance that is different from air. This can be translated into a selection of a soft button underlying the touch button.

In some embodiments, the overlay includes an overlay locating element to determine the position of the overlay to determine the orientation of the overlay relative to the touch screen. The overlay locating element can be a capacitive element that provides a position of the overlay locating element relative to the touch screen. The overlay locating element can be a visual indicator such that engagement (e.g., with a finger) at a location of the visual indicator provides the position of the overlay relative to the touch screen. The overlay can be a full overlay that is superimposed over the entire display of the computing device, or can be configured to be overlaid on a large portion of the display, or as a PIN (personal identification number) Pad for PIN number entry over a smaller portion of the display.

The overlay can include a plurality of pre-printed icons, which may be color-coded, to provide a plurality of icons that can be used to facilitate point-of-sale transactions. The overlay can be overlaid permanently, as a film layer deposited on the outer layer of the touch screen, or can be removably overlaid on the computing device, for example by adhesive or clips to secure the overlay to the display of the computing device.

Other advantages, variations, and functions are described and suggested below as can be provided in accordance with the various embodiments.

FIG. 1 illustrates an example architecture of a payment communication system 100 for enabling point-of-sale (POS) transactions between merchants 122 and buyers 126. In the example of FIG. 1, a buyer 126 can use any of a variety of payment objects, such as payment cards 130, 132 or cash 134 when participating in a POS transaction 124 with a merchant 122. A buyer 126 can typically have payment cards 130, 132 such as credit cards, debit cards, prepaid cards, and the like, that the buyer 126 can use for conducting a POS transaction 124. In some embodiments, the payment cards 130 can include one or more magnetic stripes for providing payment object and buyer information when swiped in a payment object reader 120 communicatively coupled to a merchant device 116. In some embodiments, other types of payment objects can be used, for example smart cards 132 having a built in integrated circuit including a memory chip (i.e., EMV payment objects), a radio frequency identification tag (i.e., near field communication (NFC) enabled objects), and the like. In some embodiments, the user 126 can use the user device 128 to conduct NFC payment transactions through communication between the user device 128 and the payment object reader/transmitter device 120, for example.

The payment communication system 100 in the example of FIG. 1 illustrates a merchant device 116 associated with the merchant 122 that participates in the payment service provided by the service provider of the payment processing system 102. The merchant device 116 can be a computing device (e.g., a mobile computing device) able to communicate with the payment processing system 102, and with various other computing devices, through suitable communication protocols, interfaces, and networks, including network 114. Further, the merchant device 106 can be any appropriate device operable to send and receive requests, messages, or other types of information over the network 114. Additionally, while only a single merchant device 116 is illustrated in the example of FIG. 1, in some embodiments there can be additional merchant devices depending on the number of merchants participating in the payment service, or a plurality of components arranged as a POS system.

Each merchant device 116 can include an instance of a merchant application 118 executed on the merchant device. The merchant application 118 can provide POS functionality to enable the merchant 122 to accept payments at a POS location using the merchant device 116. In some types of businesses, the POS location can correspond to a store or other place of business of the merchant, and thus, can be a fixed location that typically does not change on a day-to-day basis. In other types of businesses, however, the POS location can change from time to time, such as in the case that the merchant 122 operates a food truck, is a street vendor, a cab driver, or has an otherwise mobile business, e.g., in the case of merchants who sell items at buyers' homes, buyers' places of business, and so forth.

The merchant device 116 is communicatively coupled to a payment object reader 120, either by direct connection, for example through an audio jack of the mobile phone connected to an audio plug of the payment object reader, or through wireless connection, such as WiFi, BlueTooth, BLE (Bluetooth low energy), NFC, or other appropriate short-range communication. The payment object reader can read data from a magnetic stripe card or an EMV chip-type card and communicate the data to the mobile phone. The payment object reader can also read data from an NFC device and communicate the data to the merchant device 116.

Accordingly, the merchant 122 and the buyer 126 can conduct a POS transaction 124 by which the buyer 126 acquires an item or service from the merchant 122 at a POS location. The merchant application 118 on the merchant device 116 can send transaction information to the payment processing system 102, e.g., as the transaction is being conducted at the POS location. In some embodiments, such as if a particular merchant device 116 is not connected to the network 114 and is therefore processing transactions offline, the transaction information can be sent in a batch at a subsequent point in time or using other suitable techniques. In some embodiments, the transaction information can be sent via SMS, MMS, or a voice call.

In some embodiments, the payment system is configured to send and receive data to and from the user device and the merchant device. For example, the payment system can be configured to send data describing merchants to the user device using, for example, the information stored in the merchant account information database 106. The data describing merchants can include, for example, a merchant name, geographic location, contact information, and an electronic catalogue, e.g., a menu that describes items that are available for purchase from the merchant.

In some embodiments, the payment system can also be configured to communicate with a computer system of a card payment network 112, e.g., Visa or MasterCard, etc., over the network, or over a different network, for example, to conduct electronic financial transactions. The computer system of the card payment network can communicate with a computer system of a card issuer 110, e.g., a bank. There can be computer systems of other entities, e.g., the card acquirer, between the payment system and the computer system of the card issuer.

The payment system can then communicate with the computer system of a card payment network 112 to complete an electronic financial transaction for the total amount to be billed to the consumer's financial account. Once the electronic financial transaction is complete, the payment system can communicate data describing the card-less payment transaction to the user device, e.g., an electronic receipt, which can, for example, notify the consumer of the total amount billed to the user for the card-less payment transaction with the particular merchant.

The network 114 can be a conventional type, wired or wireless, and can have numerous different configurations including a star configuration, token ring configuration, or other configurations. Furthermore, the network 114 can include an intranet, a local area network (LAN), a wide area network (WAN) (e.g., the Internet), and/or other interconnected data paths across which multiple devices can communicate. In some embodiments, the network 114 can be a peer-to-peer network. The network 114 can also be coupled with or include portions of a telecommunications network for sending data using a variety of different communication protocols. In some embodiments, the network 114 can include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although the example of FIG. 1 illustrates one network 114 coupled to the merchant device, payment processing system, card payment network, and bank, more that one network 114 can connect these entities. The payment system, the merchant device, and the user device can communicate over the network using wired or wireless connections, or combinations thereof.

Figure 2:
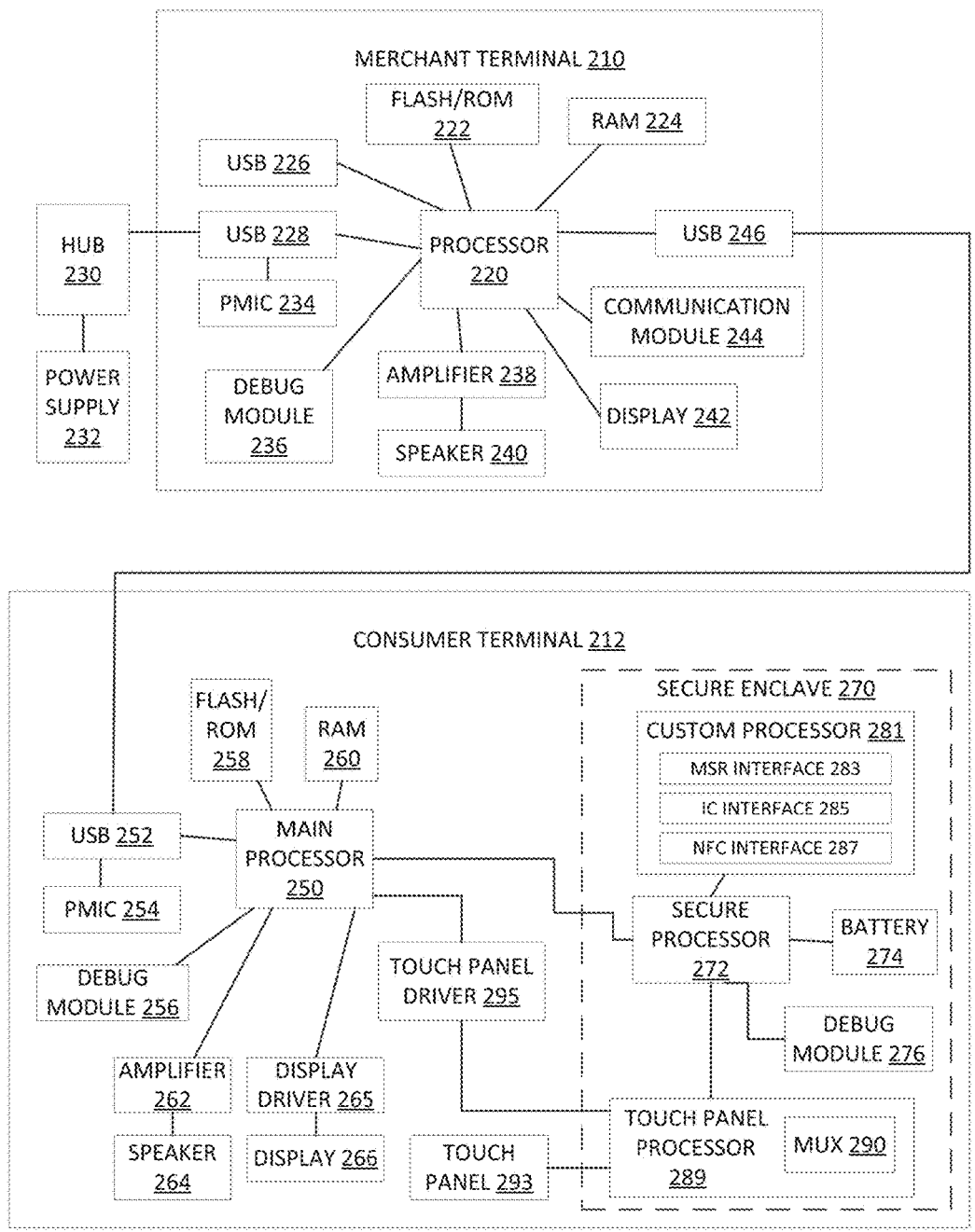
FIG. 2 illustrates an example schematic diagram of components of each terminal in a point-of-sale system for enabling transactions between merchants and buyers.

Reference is now made to FIG. 2 illustrating an example schematic diagram of components of each terminal in the point-of-sale system in accordance with an embodiment. The point-of-sale system 200 includes a merchant terminal 210 and a consumer terminal 212. The merchant terminal 210 includes non-transitory computer readable instructions stored in memory 222 that when interpreted by a merchant terminal processor causes the merchant terminal processor to display a series of screens in a display of the merchant facing graphical user interface for guiding a merchant through a point of sale transaction. The consumer terminal 212 includes non-transitory computer readable instructions stored in memory 258 that when interpreted by a non-secure consumer terminal processor causes the non-secure consumer terminal processor to display a series of screens in a consumer facing graphical user interface on the display for guiding the consumer through the point-of-sale transaction.

The merchant terminal 210 includes a SoC (System-on-chip) processor 220 and associated flash memory 222 and RAM 224. A USB-A port 226 is provided for connecting other devices or components to the merchant terminal 210 as appropriate. A USB+Power port 228 is provided connected to a hub 230 for various peripherals associated with a point-of-sale system, including a receipt printer, cash drawer, barcode scanner, scale, keyboard, USB-Ethernet dongle/USB mifi, and other point-of-sale peripheral components known in the art. The hub 230 can be a 5-port USB hub in some embodiments. While both a USB-A port and a USB+Power port are separately identified, such should not be considered limitation. Additionally, although the connectors are shown as being USB, any universal adapter can be implemented to connect other devices to the merchant terminal and to connect the merchant terminal to the consumer terminal. A Power Management Integrated Circuit (PMIC) 234 is in communication with the micro USB connector 228. A PMIC is an integrated circuit for managing power requirements of the host system. Merchant terminal can have any number of USB ports, and the ports can be of any suitable characteristics. A power supply 232 can be provided as power through the hub 230 via connector 228 on the merchant terminal 210. In some embodiments, power can be provided directly to the merchant terminal, for example via USB connector 226. A debug module 236 is provided for appropriate debugging of the merchant terminal 210 and the various components thereof. An audio amplifier 238 is provided and a speaker 240 for providing the appropriate audio for the merchant terminal 210. A display 242 can be connected to the processor 220, for example a 13.3-inch LCD display having a resolution of 1920×1080 IPS 166 PPI. The display 242 provides the interfaces and outputs to the merchant terminal 210 to be viewed by a merchant. A communication module 244 is in communication with the processor 220 to perform the communication for the merchant terminal, for example, with the consumer terminal and other point-of-sale system components, or for example a payment system. The communication module 244 can include one or more interfaces and hardware components for enabling communication with various other devices, such as over the network(s) 114 shown in FIG. 1. For example, communication module 244 can enable communication through one or more of the internet, cable networks, wireless networks (e.g., Wi-Fi), and wired networks, as well as close-range communications, such as Bluetooth®, Bluetooth® Low Energy (BLE), near field communication (NFC) and the like, as additionally enumerated elsewhere herein.

In some embodiments, the communication module 244 can include a cellular communications transceiver for sending and receiving data over a cellular communications network such as via voice call, short messaging service (SMS), multimedia messaging service (MMS), hypertext transfer protocol (HTTP), direct data connection, WTP, e-mail or another suitable type of electronic communication. In some embodiments, the communication module 244 also provides other conventional connections to the network for distribution of files and/or media objects using standard network protocols such as TCP/IP, HTTP, HTTPS and SMTP, etc.

A USB port 246 is provided for detachably connecting the merchant terminal 210 to the consumer terminal 212. The term "detachably" is intended to refer to the ability for the merchant terminal to be connected to the consumer terminal but also configured to being detached from the consumer terminal when desired for storage, upgrades, or other uses. This mating between the terminals can be through direct wired connections shown or wirelessly, in some embodiments.

Other components included in the merchant terminal 210 can include various types of sensors (not shown), which can include a GPS device, an accelerometer, gyroscope, compass, proximity sensor, etc. Additionally, the merchant terminal 210 can include various other components that are not shown, examples of which includes removable storage, an internal power source such as a battery and a power control unit, and so forth.

The consumer terminal 212 includes a SoC processor 250 connected to the micro USB 252 for communication with the merchant terminal 210. A Power Management Integrated Circuit (PMIC) 254 is in communication with the micro USB connector 252. A PMIC is an integrated circuit for managing power requirements of the host system. A debug module 256 is provided for the processor 250 for the appropriate debugging of the consumer terminal 212 and the various components thereof. The processor 250 is coupled to flash memory 258 and RAM 260 for appropriate storage and processing of data. An audio amplifier 262 and speaker 264 are provided for any audio for the consumer on the consumer terminal 212. A display 266 is provided, such as a 7-inch LCD touch-screen display having a resolution of 1280×800 IPS 216 PPI. The display 266 provides interfaces and the outputs of the point-of-sale system to the consumer terminal 212. A display driver 265 controls the display 266.

Memory in the merchant terminal 210 and the consumer terminal 212, including flash/ROM 222, RAM 224, flash/ROM 258 and RAM 260 are examples of non-transitory computer storage media (e.g., computer-readable media) and can include volatile and non-volatile memory and/or removable and non-removable media implemented in any type of technology for storage of information such as computer-readable processor-executable instructions, data structures, program modules or other data. The computer-readable media can include, but is not limited to, RAM, ROM, EEPROM, flash memory, solid-state storage, magnetic disk storage, optical storage, and/or other computer-readable media technology. Further, in some cases, the merchant device 210 can access external storage, such as RAID storage systems, storage arrays, network attached storage, storage area networks, cloud storage, or any other medium that can be used to store information and that can be accessed by the processor directly or through another computing device or network. Accordingly, the memory 222, 224 or 258, 260 can be computer storage media able to store instructions, modules or components that can be executed by the processor 220 or 250, respectively.

The display 266 of the consumer terminal 212 (and, likewise the display 242 of the merchant terminal 210) can employ any suitable display technology. For example, the display 242 and the display 266 can be a liquid crystal display (LCD), a plasma display, a light emitting diode (LED) display, an OLED (organic light-emitting diode) display, an electronic paper display, or any other suitable type of display able to present digital content thereon. The consumer terminal can include a touch panel 293 associated with the display 266 to provide a touchscreen display configured to receive touch inputs for enabling interaction with a graphical user interface presented on the display. Accordingly, embodiments described herein are not limited to any particular display technology. In some embodiments, the merchant device may not include a display, and information can be presented via the speaker 264.

A secure enclave 270 is included in the consumer terminal 212. The secure enclave includes a secure processor 272 coupled to the main terminal processor 250, an anti-tamper battery 274, and a secure debug module 276. Each processor, including the merchant terminal processor 220, the consumer terminal main processor 250, the secure processor 272, the custom processor 281 and the touch panel processor 289, can each comprise one or more processors or processing cores. For example, the processor(s) 220, 250, 272, 281 and 289 can be implemented as one or more microprocessors, microcomputers, microcontrollers, digital signal processors, central processing units, state machines, logic circuitries, and/or any devices that manipulate signals based on operational instructions. In some embodiments, the processor(s) 220, 250, 272, 281 and 289 can be one or more hardware processors and/or logic circuits of any suitable type specifically programmed or configured to execute the algorithms and processes described herein by performing various input/output, logical, and/or mathematical operations. The processor(s) 220, 250, 272, 281 and 289 can be configured to fetch and execute computer-readable processor-executable instructions stored in the memory 222, 224, 258 and 260.

The secure processor receives inputs from the custom processor 281 equipped with a magnetic stripe interface 283, an integrated circuit interface 285 and a near field communication (NFC) interface 287.

All inputs received by the consumer terminal at the touch panel 293 (for example, as entries into a payment application or a register-buddy application in communication with the merchant terminal), are sent to the touch panel processor 289 having a multiplexer 290 configured to put the consumer terminal into (1) a secure mode when the main processor makes a request to receive secure data, and the data does not exit the secure enclave, and (2) a normal mode when the secure processor determines completion of the secure data entry, where data is passed through to the main processor 250. A multiplexer 290 receives inputs from a touch panel 293 and directs inputs to the main processor when in the normal mode, via the touch panel driver in a pass-through mode, and directs inputs received in the touch panel to the secure processor when in the secure mode. In some embodiments, the main processor on the merchant terminal and the consumer terminal will each run their own operating system (including possibly two different copies of the same operating system, different versions of the same operating system, or different operating systems altogether, etc.).

Figure 3:
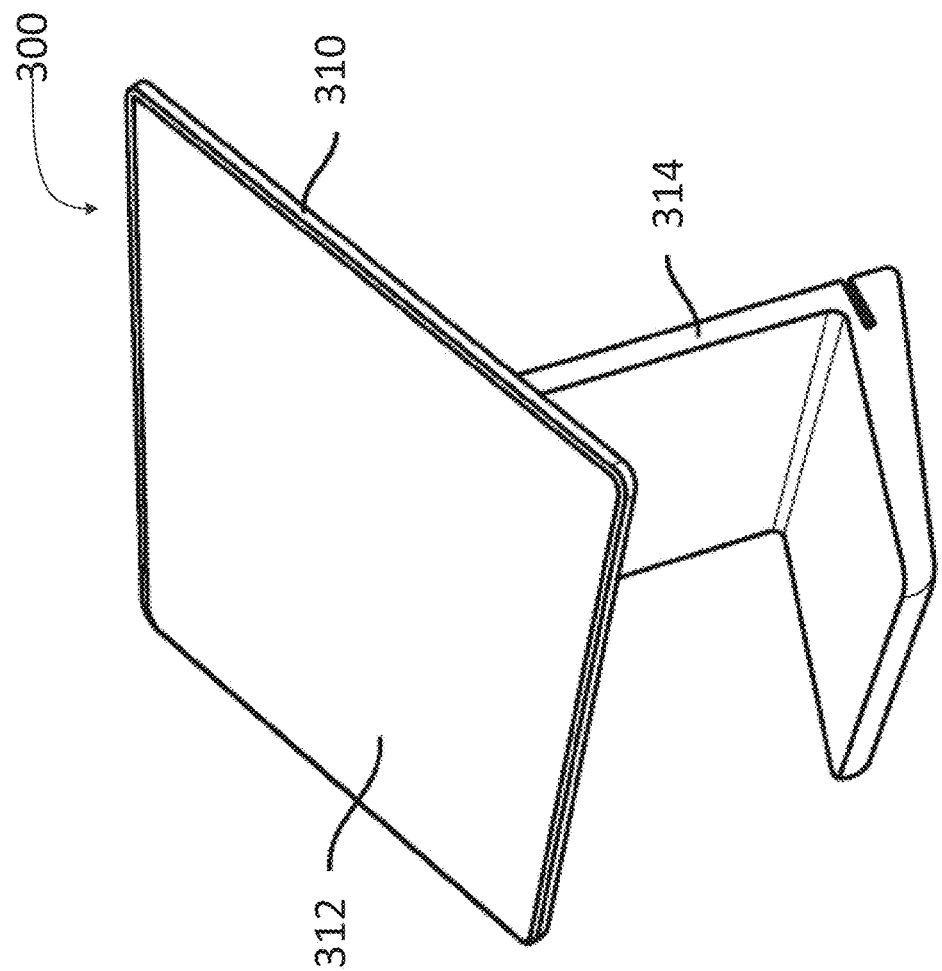
FIG. 3 illustrates an example point-of-sale system as viewed from a front perspective view, including a first terminal and a second terminal that are detachably mated together and shown in a fixed position, in accordance with an embodiment.
Figure 4:
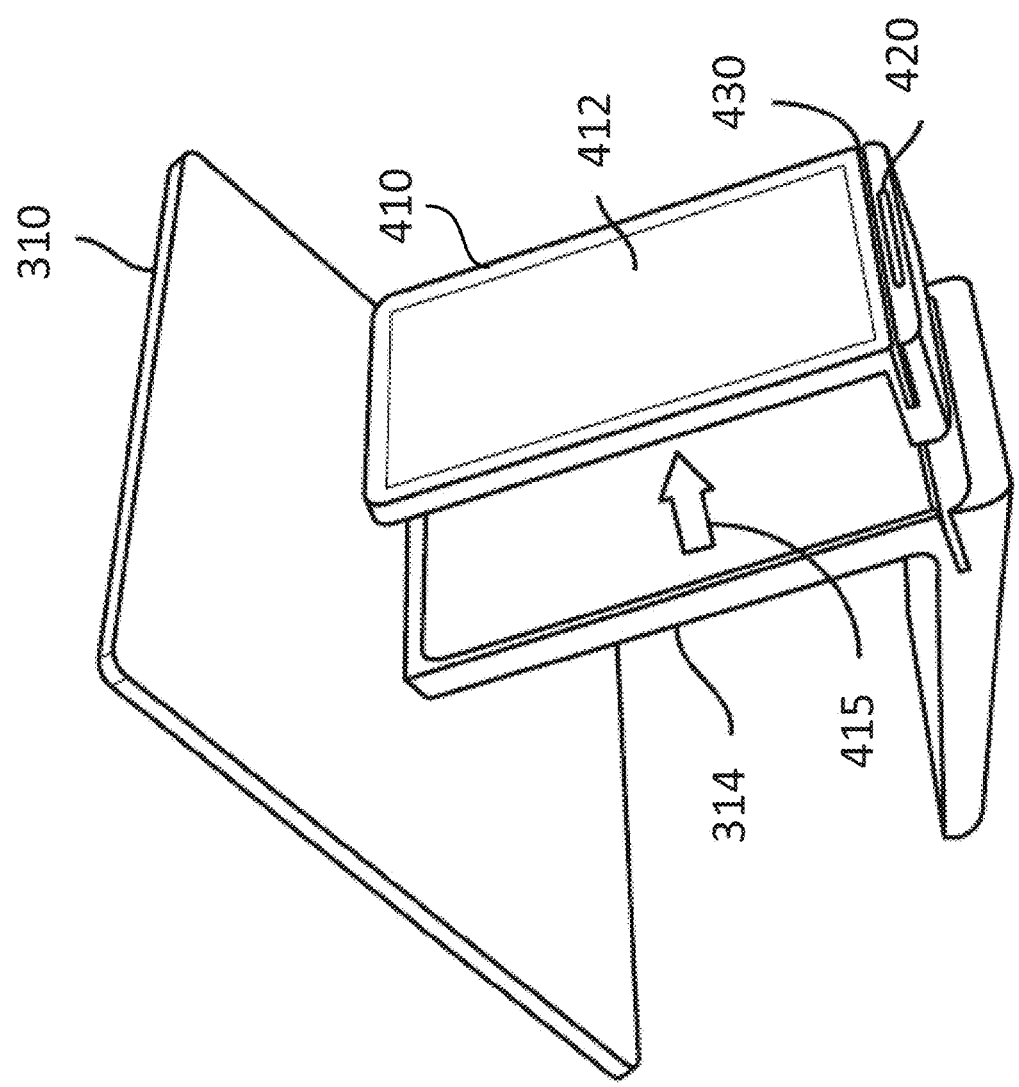
FIG. 4 illustrates the example point-of-sale system of FIG. 3 as viewed from a back perspective view, and showing the second terminal being separated from the first terminal, in accordance with an embodiment.

Reference is now made to FIGS. 3 and 4, illustrating an example point-of-sale system 300. FIG. 3 illustrates an example point-of-sale system 300 as viewed from a front perspective view, including a first terminal and a second terminal that are detachably mated together and shown in a fixed position, in accordance with an embodiment. The first terminal 310 can comprise, for example, a terminal similar to the merchant terminal 210 of FIG. 2 or the merchant device 116 in FIG. 1. The point-of-sale system 300 includes a first terminal 310 configured, for example, to be a merchant terminal in a merchant-facing direction. The first terminal 310 includes a first computing device 312 and a base 314 into which the second terminal is detachably received. The first computing device 312 can be a separate device that is inserted into the terminal or formed integral into the terminal as a single, unitary structure.

FIG. 4 illustrates the example point-of-sale system of FIG. 3 as viewed from a back perspective view, in accordance with some embodiments, and showing the second terminal 410 being separated with ease from the first terminal 310, as shown by arrow 415. The second terminal 410 is detachably received in the base 314 of the first terminal 310. The second terminal 410 can comprise, for example, a terminal similar to the consumer terminal 212 of FIG. 2. The second terminal 410 includes a second computing device 412. The second computing device 412 can be a separate device that is inserted into the terminal 410 or formed integral into the terminal as a single, unitary structure. The second terminal 410 can include a first "dip slot" card reader 420 configured to read integrated circuit (IC) chip-type cards and a second "swipe slot" card reader 430 configured to read magnetic swipe-type cards. The term "dip slot" refers to a slot or other opening configured to receive or otherwise read a chip-type card via contact or contact-less EMV or NFC communication. The term "swipe slot" refers to a slot or other opening configured to receive a magnetic swipe-type card. In some embodiments, the card reader 420 and the card reader 430 can be replaced with a single hybrid card reader configured to accept both chip-type card and magnetic stripe-type cards. The second terminal 410 can also include an NFC interface within the internal components of the second terminal 410 to participate in NFC payment transactions. For example, the NFC interface could be similar to NFC interface 287 in FIG. 2

Each terminal can be physically independent of the other and arranged in a separated position, or mated together as shown in FIG. 4. When separated, the first terminal and the second terminal are in communication with each other or otherwise mated together via wired or wireless communication. The thin wedge shape of the second terminal 1010 welcomes customers to pick up and hold the second terminal 1010 for usage of the terminal.

Some users may have difficulty using the consumer terminal 410, for example for PIN entry or signature entry, when the computing device 412 is a touch-screen computer or other flat-screen device.

Accordingly, an overlay 500 may be provided for one or more of a merchant terminal 310, a consumer terminal 410, or more generally a computing device having a flat surface for data entry. The overlay includes overlay buttons to render an otherwise inaccessible device as being accessible by a visually impaired person. The overlay 500 includes a plurality of cut-out openings, including circular openings 510, 512 and 514. The cut-out openings can also be square-shaped, such as opening 516. The shape and placement of the openings is variable depending upon the particular computing device onto which the overlay is overlaid, as well as the particular application executing on the computing device, that is configured to display soft buttons that are represented by the overlay buttons of the overlay. Each opening can have a donut, such as donut 520 around the edge of the cut-out opening 510, which can be a depressed edge or a raised edge that provides a sensory feedback to the user of the computing device to differentiate between buttons. In some embodiments the overlay 500 has a thickness 305 of less than one-half of an inch, and can range from a few hundred micrometers up to one inch in thickness, depending upon the underlying display of the computing device. Although depicted as cut-out openings 310, 312, 314 and 316, these openings could also be raisings or buttons, such as a standard push-button switch, a contact-lens shape of a button, or other buttons to provide tactile feedback to a user.

The overlay can be a small clip in some embodiments. The overlay can also provide protection from scratching or smudging the underlying screen surface.

Figure 5:
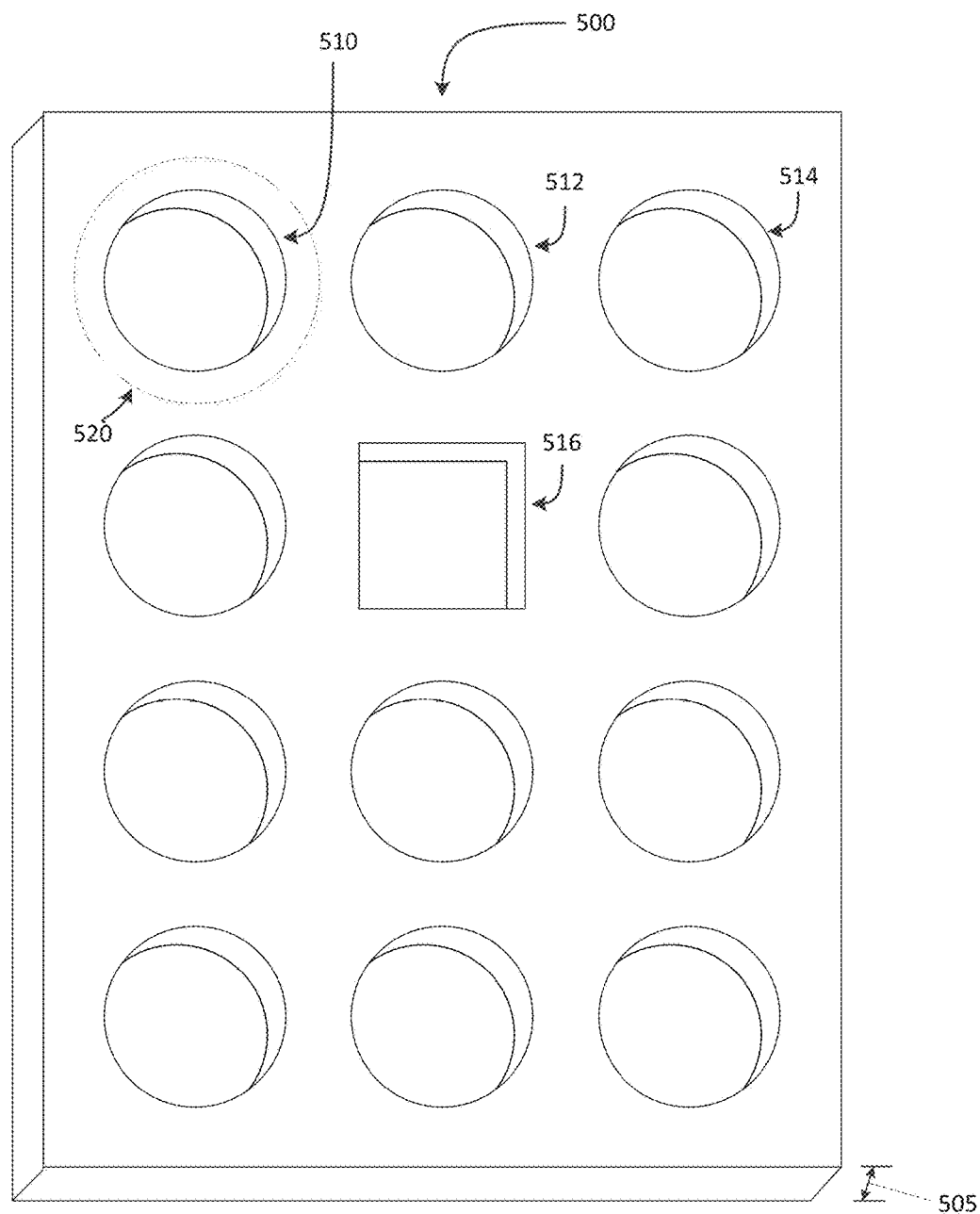
FIG. 5 illustrates a perspective view of an example overlay for a touchscreen device.
Figure 6A:
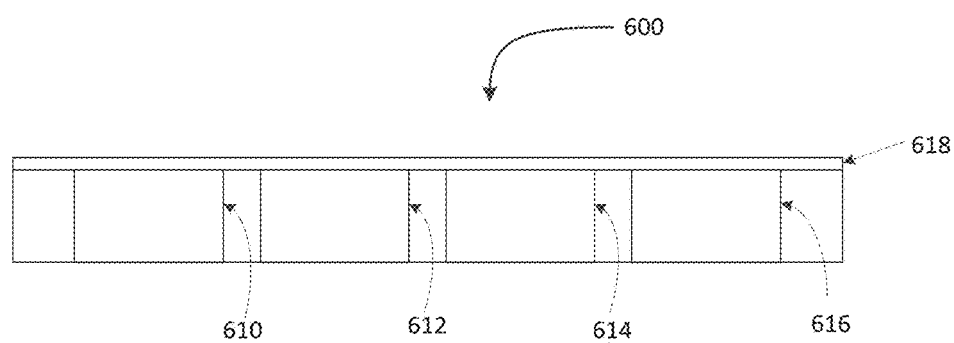
FIG. 6A illustrates an example side view of an example overlay for a touch screen device.
Figure 6B:
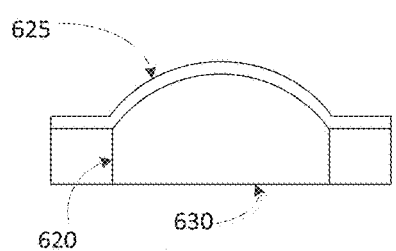
FIG. 6B illustrates an example side view of an overlay button of a tactile overlay, with the overlay button shown in a normal resting position, where the overlay button has not been depressed.
Figure 6C:
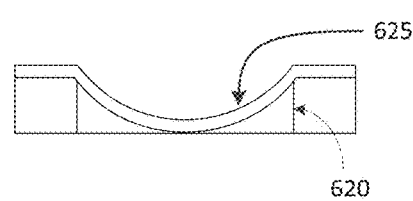
FIG. 6C illustrates an example side view of the overlay button if FIG. 6B, with the overlay button shown in a depressed position, where the overlay button has been depressed.

Reference is now made to FIGS. 6A-6E showing example embodiments of an overlay button. FIG. 6A shows a side view of an overlay 600 having plurality of buttons 610, 612, 614, 616 and a topmost coating 618. The overlay buttons 610, 612, 614, 616 can comprise cut-out openings, similar to those shown in FIG. 5, or can be a button with an outer coating to protect an inner cavity of the buttons 610, 612, 614 and 616. FIG. 6B shows an example soft button cavity 620 having a top surface coating 625. The soft button cavity 620 can be filled with air or liquid that is capable of detecting a change in the amount of pressure within the cavity 620. The cavity 620 can be filled with a conductive material such that contact with the top surface 625 causes the material inside the cavity 620 to detect a contact, and to register selection of the soft button to provide appropriate feedback as a selection of the underlying soft button. The top surface 625 of the button can be curved as a contact lens such that it pops up to the position shown in FIG. 6B, and upon contact, pops down into the position shown in FIG. 6C. FIG. 6C shows the example soft button opening 620 and top surface 425 with the button shown in a depressed position. The top surface 625 can be a capacitive plastic in some embodiments that detects touch.

A bottom surface 630 of the cavity 620 can include a capacitive component to provide feedback to a touch screen. Contact with the button causes the capacitive input to be sent to an underlying capacitive component and, thus, to the touch screen. In some embodiments, bottom surface 630 can be removed such that top surface 625 directly contacts the touch screen when the button is depressed.

Figure 6D:
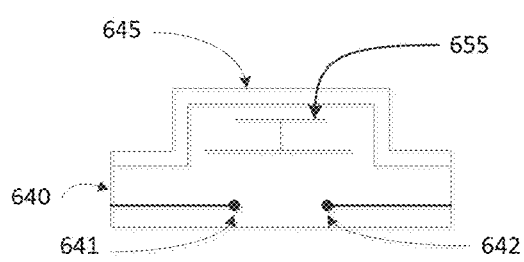
FIG. 6D illustrates an example side view of a push-button of a tactile overlay, with the push-button shown in a normal resting position, where the overlay button has not been depressed.
Figure 6E:
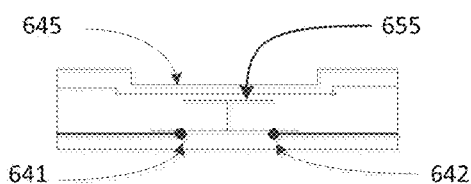
FIG. 6E illustrates an example side view of the push-button if FIG. 6C, with the push-button shown in a depressed position, where the push-button has been depressed.

FIG. 6D is an example embodiment of an overlay button for an overlay, with the overlay button implementing a standard push-button switch to provide feedback. The cavity 640 includes a first lead 641 and an opposing lead 642 which are not in contact with each other when the push-button is in its resting position. When a user depresses on the outermost surface 645 of the button, the push-button switch 655 is pushed downward so as to contact the leads 641, 642, as shown in FIG. 6E. Once the push-button switch 655 contacts the leads 641, 642, the proper feedback is provided to the display as an input at the soft button underlying the overlay button surface 645.

Figure 7:
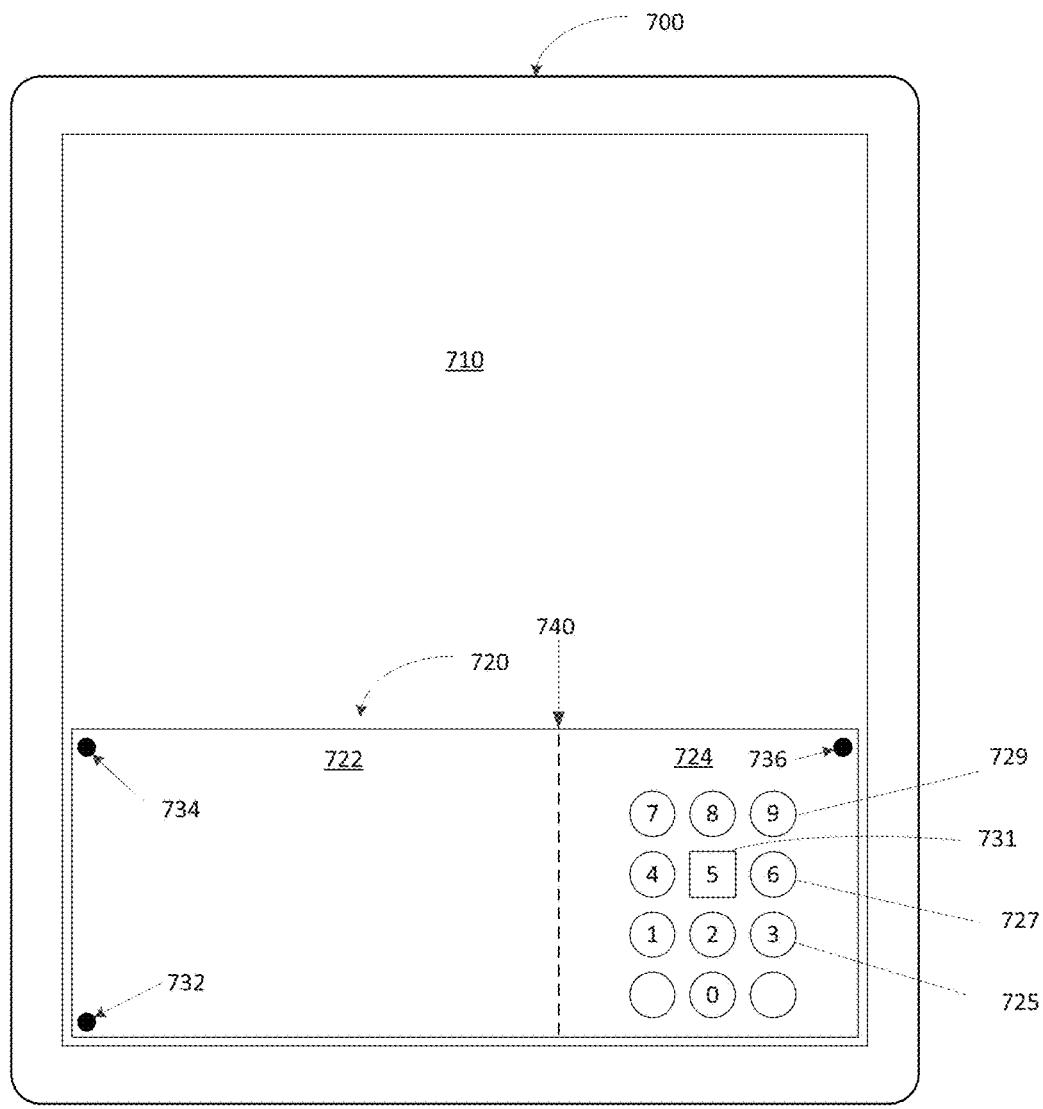
FIG. 7 illustrates an example top view of a computing device including a touchscreen display having a tactile overlay superimposed on a first portion of the touch-screen display.

Reference is now made to FIG. 7 showing a computing device 700 having a display 710. In this example diagram, the display 710 has an overlay 720 superimposed on a lower portion of the display 710. The overlay 720 includes a first portion 722 and a second portion 724. The first portion 722 can be configured, for example, to provide an area for signature for a magnetic-stripe type of card, or for visualization of other information as appropriate. In some embodiments, the first portion 722 can include a cut-out for inputting signatures or other input to the display 710 of the computing device 700. The second portion 724 can include a PIN pad with a plurality of buttons, including a central square-shaped button 731, and a plurality of circle-shaped buttons, including circle-shaped buttons 725, 727 and 729. The buttons can have any appropriate shape to provide a tactile, sensory or haptic response to the user of the computing device 700. For example, buttons 725, 727, 729 and 731 can be standard push-button switches or liquid-filled or air-filled cavities that are capable of receiving inputs while providing a tactile or haptic response to the user. The pin pad buttons can be depressions or a raised surface, or can be a contact lens-shaped type of key where the user presses the center of the key and the key depresses. The profile of the contact lens-shaped type of button (for example, as shown in FIGS. 6B-6C) can have a capacitive plastic so that when a user hovers over the plastic, they do not actually trigger the touch indicator, but when the user depresses or otherwise contacts the plastic, an indication that the key was pressed is made.

The overlay 720 includes at least one overlay locating element to assist in determining the location of the overlay 720 such that the underlying soft buttons can be properly displayed on the display 710. In the example overlay 720, there are three overlay locating elements 732, 734, 736 provided, although some embodiments can include one, at least two, at least three, or at least four overlay locating elements. The overlay locating elements can be used to indicate to the display that the overlay has been superimposed on the external surface of the display. The overlay locating elements 732, 734, 736 can be visual indicators, such that engagement with the visual indicators by a finger or thumb of the person using the computing device 700 provides the position of the overlay relative to the touch screen by capacitively sensing fingers at the overlay locating elements 732, 734, 736. In some embodiments, the overlay locating elements 732, 734, 736 can be capacitive elements embedded in the overlay that are detected by the touch-screen of a computing device and/or an application running on the computing device.

In some embodiments, the overlay 720 includes a perforation 740 that can be used to separate the portion 724 from the portion 722, such that only the portion 724 including the PIN pad entry is utilized for the display 710.

Figure 8:
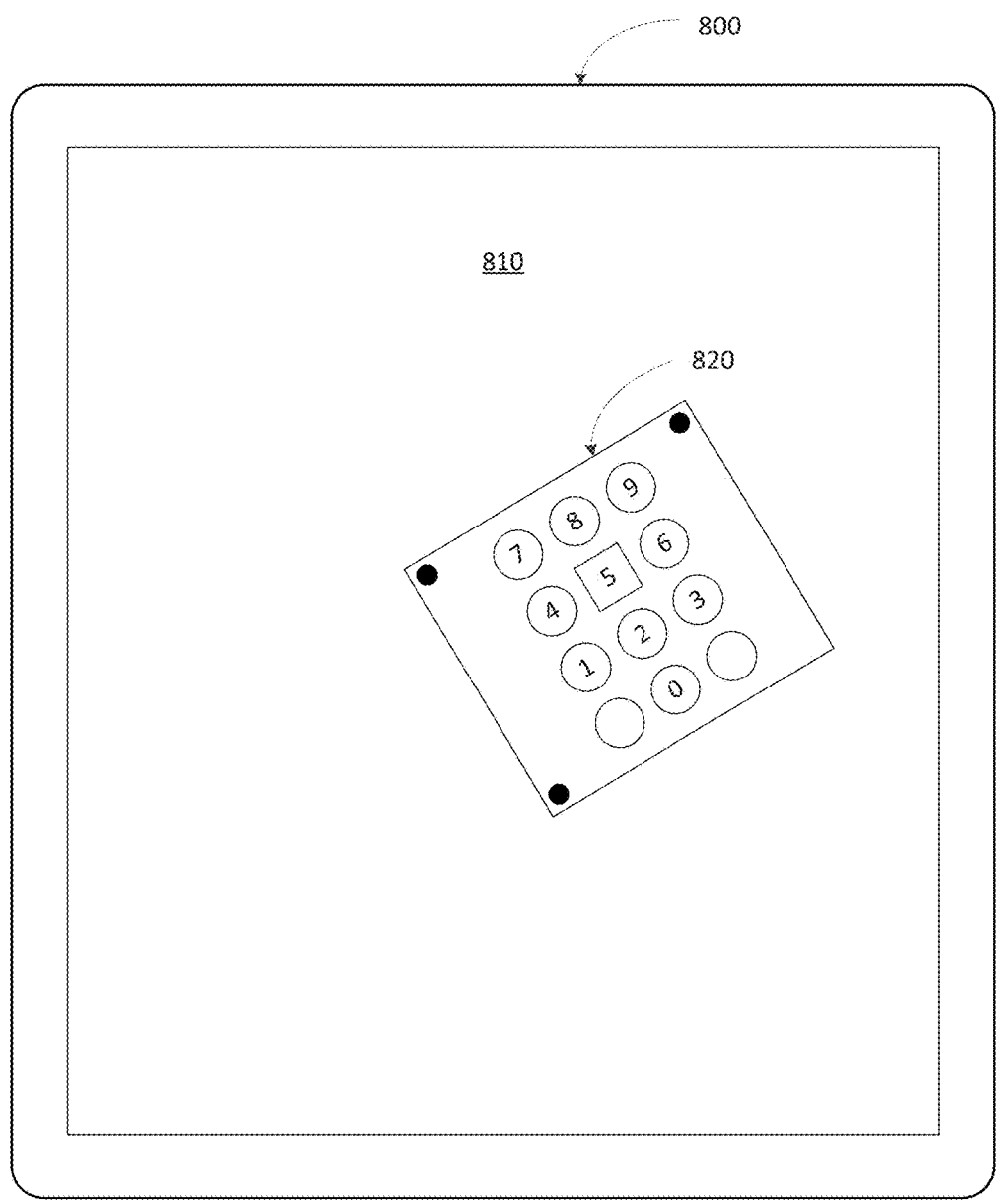
FIG. 8 illustrates an example top view of a computing device including a touch screen display with a tactile overlay superimposed in a crooked orientation relative to a second portion of the touch-screen display.

Reference is now made to FIG. 8 showing a top view of an example computing device 800 having a display 810 with an overlay 820 superimposed in a crooked orientation relative to the display 810. The overlay 820 includes the PIN pad entry and further includes overlay locating elements. The overlay locating elements indicate to the computing device 800 the position of the overlay 820 such that the soft touch buttons on the device 810 can be reconfigured to properly display at the location where the overlay 820 is positioned.

This allows the keypad overlay 820 to be a one-size-fits-all solution for all touchscreen or flat-screen displays, which can be an adhesive plastic film that is reconfigurable depending upon the orientation of the overlay relative to the underlying device. In some embodiments, the screen behind the overlay is resized to fit the keypad. In some embodiments, the overlay locating elements are configured to have the device and underlying soft buttons automatically displayed when the overlay is detected on the external surface of the display, and to likewise have the device and underlying soft buttons no longer displayed once it is detected that the overlay is no longer on the external surface of the display.

The overlay locating elements can be used to simply indicate to the computing device that the overlay is present, so as to switch into a second mode where the tactile feedback buttons are provided on the overlay and input is provided as though input to soft buttons via the tactile feedback buttons. When the overlay locating elements are gone, an indication can be generated to switch the computing device back into a first mode where the inputs are received directly at soft buttons the touch-screen display.

Figure 9:
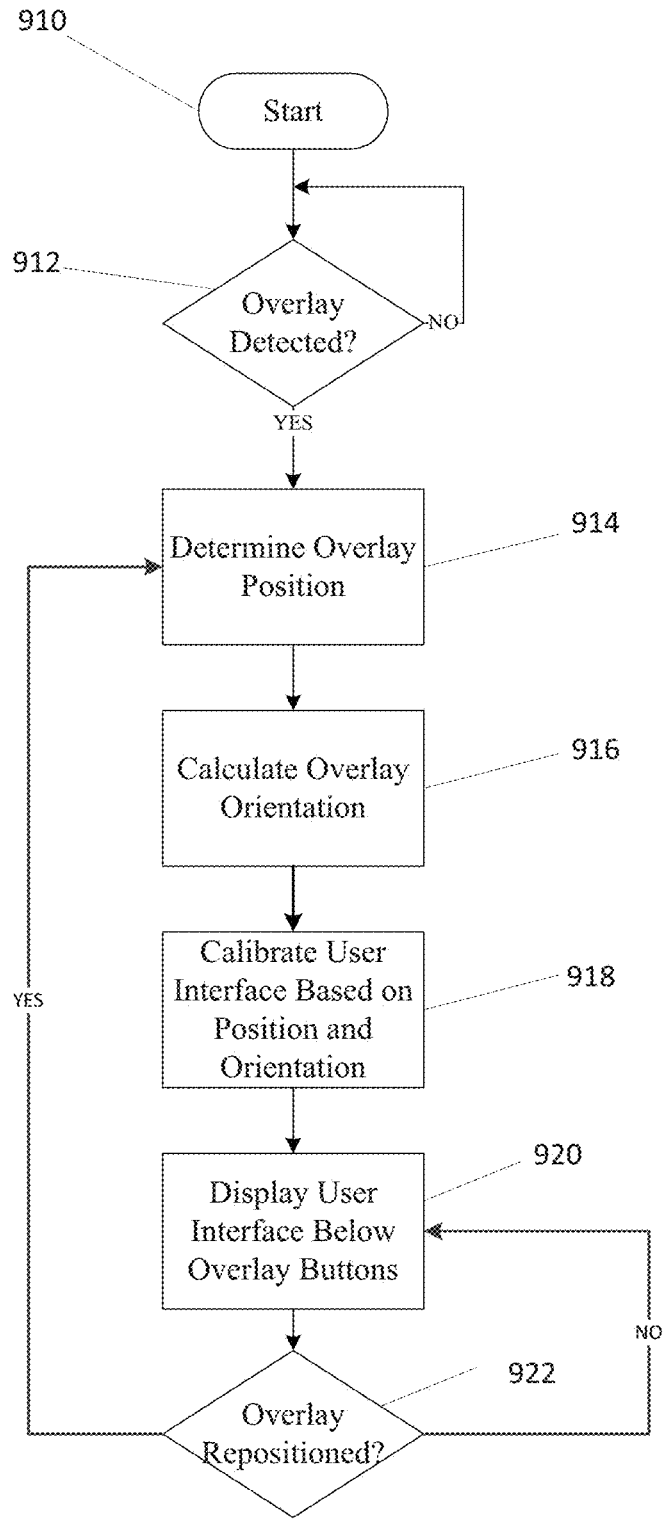
FIG. 9 illustrates an example flow chart of a procedure for detecting the position of the overlay and displaying user interface soft buttons according to position of tactile feedback buttons.

FIG. 9 illustrates an example flow chart of a procedure for detecting the position of the overlay and displaying user interface soft buttons according to position of tactile feedback buttons. At 910, the procedure starts. At 912, it is determined if an overlay is detected. If there is no overlay detected, the system continues to search for an overlay being superimposed on the display of the computing device. At 912, if an overlay is detected, it is possible for the display to change modes, such that high contrast soft buttons are displayed. In some embodiments, when the overlay is applied to the display of the computing device, it can generate a blinking from a light to accommodate people with different visual impairments, and placement of the overlay can also provide an auditory or vibratory feedback for the user. At 912, an overlay can be detected and at 914, the position can be determined in any one of the ways shown and described herein. A first example is dots embedded in the overlay that simulate capacitive touch. When the computing device detects the presence of the overlay, it may be configured to identify the locations of the dots simulating capacitive touch to determine the position of the overlay relative to the touch screen. A second example is at least two coordination dots, where touching the fingers on the dots relays the position of the overlay to the device. A third example is visually determining the location of the device, for example using a large jumbo-sized button, to physically resize the underlying buttons on the touchscreen to match the overlay. For example, a two-finger zoom gesture can stretch or shrink the user interface (UI) beneath the overlay.

From the position of the overlay at 914, the orientation of the overlay relative to the touch screen is then calculated at 916. The user interface is then calibrated at 918 based on the orientation of the overlay. At 920, the user interface is displayed at a position that is underlying, or below, the overlay buttons. For example, the display is configured to display the soft buttons that underlie the tactile feedback buttons at a position that is proximate the overlay such that the tactile feedback buttons are representative of, and overlying, the soft buttons of the underlying display.

In some embodiments, the overlay locating elements can be used to detect a repositioning of the overlay. At 922, if it is determined that the overlay has repositioned, and then the procedure returns to 914 to determine the position of the overlay. If the overlay has not been repositioned, then the user interface is continued to be displayed below the overlay buttons.

In some embodiments, the overlay can be glow-in-the-dark, or have some sort of photo luminescent chemical so that the overlay is more visible in low light conditions. For example, if the overlay were lost or in a dark bag, the glow-in-the-dark properties render the overlay easier to locate.

Figure 10:
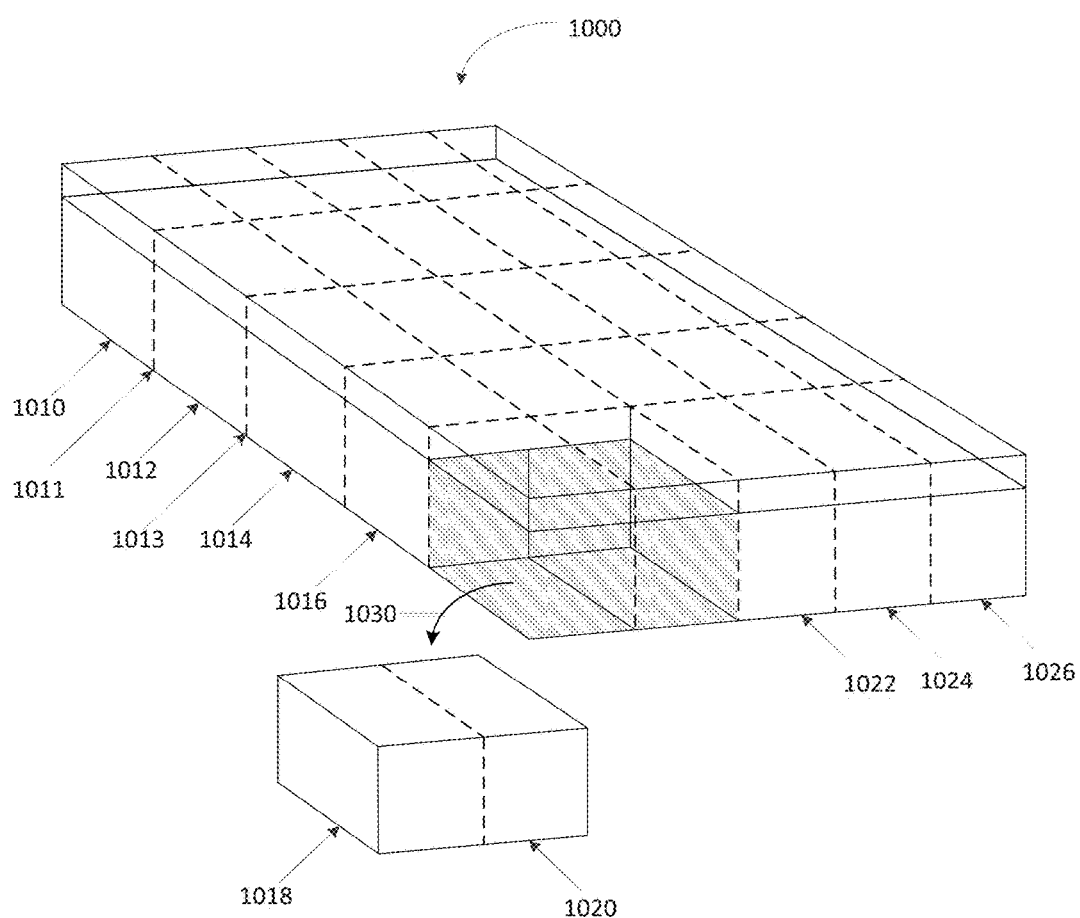
FIG. 10 illustrates an example diagram of an overlay for a computing device having perforations for custom sizing the overlay.

FIG. 10 illustrates an example diagram of an overlay for a computing device having perforations for custom sizing the overlay. In an embodiment, the overlay 1000 can be comprised of a plurality of blocks, for example blocks 1010, 1012, 1014, 1016, 1018, 1020, 1022, 1024 and 1026 along an outer perimeter of the overlay 1000. The overlay 1000 includes a plurality of perforations that allow the overlay 1000 to be custom-sized by removing the blocks as desired. Block 1010 and 1012 are separated by perforation 1011, and likewise block 1012 and block 1014 are separated by perforation 1013. The blocks 1018, 1020 can be removed (via arrow 1030) such that a smaller overlay can be applied to a display of a computing device. Likewise, blocks 1018, 1020 can together be applied as a smaller overlay onto a display of a computing device.

The custom sizing of the overlay allows for users to purchase a sheet of overlay, and tear off or otherwise remove the portion needed for the particular screen. In some embodiments, the tactile overlay can be pre-optimized for different types of business. For example, by analyzing items in a sales catalog, sales data and transaction data, the specific type and size of overlay that is needed can be determined. An application-based tool can be provided, for example online as a separate web-based application, or as an application integrated into the application running on the device that is used to build, or otherwise generate, customized overlays. Thus, the merchants can configure the screen as described and the overlay can be recommended by the overlay builder tool, to thereby optimize line time for the particular merchant. By analyzing transaction time data, such as how long it takes to key in an order or complete an order), it is possible to improve line time and overall efficiency by customizing the overlay to improve transaction time and line time.

Figure 11:
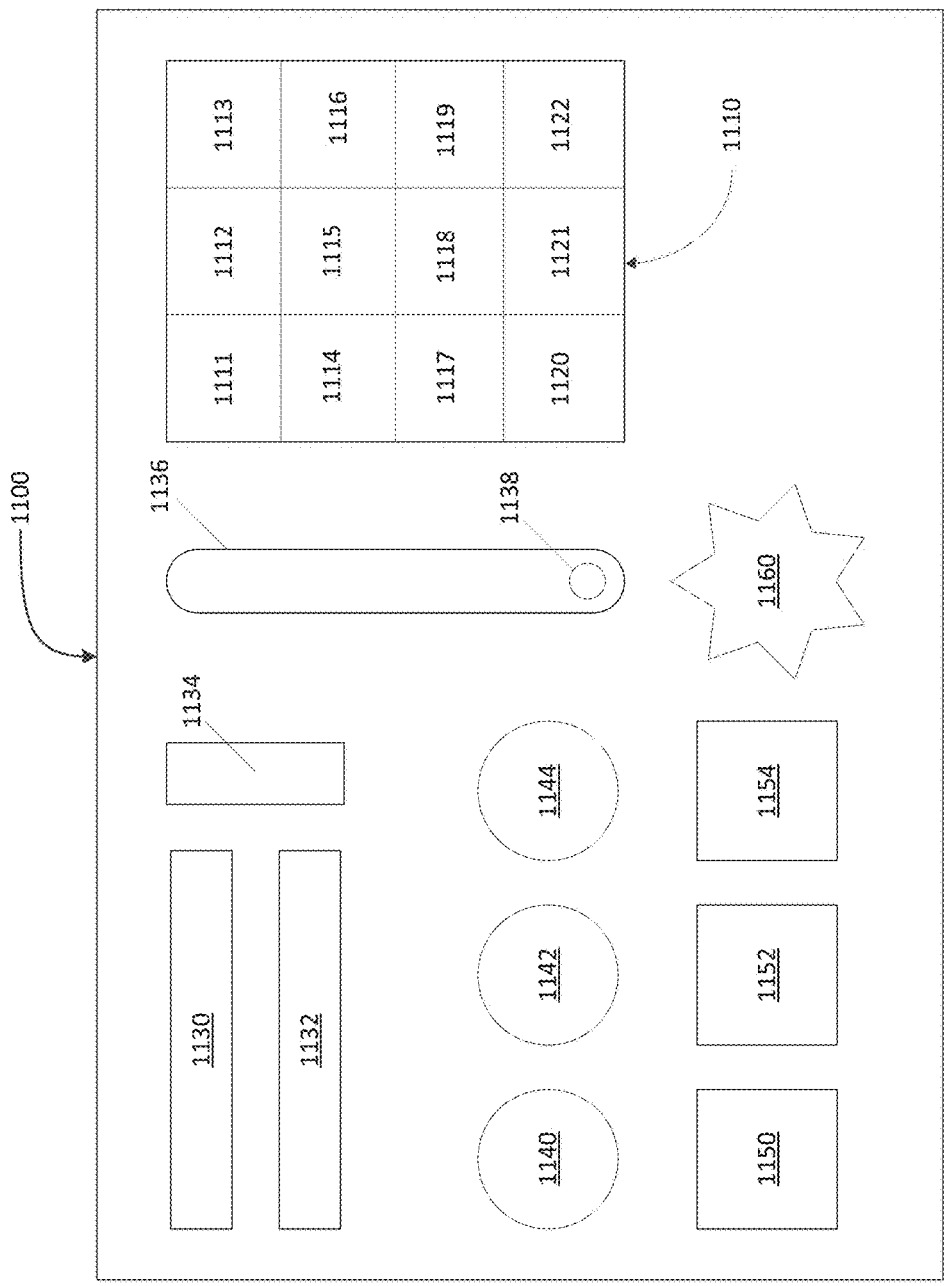
FIG. 11 illustrates an example diagram of an overlay for a computing device including a plurality of pre-provided buttons on the overlay.

FIG. 11 illustrates an example diagram of an example overlay for a computing device including a plurality of pre-provided buttons on the overlay. The overlay 1100 can be used, for example, at a restaurant or other point-of-sale location where there are a plurality of items that are displayed for purchase on a generally flat-screen or touch-screen display. By providing an overlay 1100 with a plurality of pre-provided buttons, a merchant or other user of the device is able to operate more efficiently. Improving efficiency is a critical metric for many restaurants and point of sale locations, particularly for quick service restaurants. By moving from a conventional point of sale system that uses physical buttons to a tablet or other portable computing device, this can potentially reduce the efficiency and slow down line time (i.e. time spent waiting in line). By providing an appropriate overlay with pre-provided icons in appropriate locations, the overall efficiency improves, as the checkout can occur even more quickly than with conventional point of sale systems having conventional buttons. The buttons in an overlay can be customized to each seller or merchant, to improve and streamline the checkout procedure. Similarly, when the menu or list of available items changes, the overlay can likewise be changed, without requiring extensive reconfiguration of the point of sale system.

The overlay 1100 can include a PIN pad portion 1110 with a plurality of keys 1111, 1112, 1113, 1114, 1115, 1116, 1117, 1118, 1119, 1120, 1121, 1122, each individually configurable to provide tactile or haptic feedback to a user of the device, while providing the inputs into the overlay buttons to the computing device. The keys of the PIN pad portion 1110 can each be configured in accordance with the techniques herein to provide tactile or haptic feedback response to a user of the computing device. The keys can include a raised or depressed edge, can be a cut-out, or can be a liquid-filled or air-filled cavity to receive the input and provide tactile feedback to the user.

The overlay 1100 can also include a first horizontal slider 1130, a second horizontal slider 1132 and a vertical slider 1134, each configured to receive input on a sliding scale and by a sliding input to the appropriate element. In some embodiments, a graphical display can be provided proximate each slider 1130, 1132, 1134, to provide the desired indicator of the value associated with the slider. For example, the slider 1130 may control brightness of the screen, and the overlay button 1130 provides the desired tactile feedback and the inputs received to the overlay button 1130 are provided to the underlying display for proper processing. The overlay 1100 can also include a large vertical slider 1136 with sliding element 1138. A plurality of circular-shaped buttons 1140, 1142, 1144 can be provided. These can be cut-out openings, a contact lens-shape opening, a button with a capacitive outer layer, or other techniques described herein for the overlay buttons. The overlay can include a plurality of square-shaped buttons 1150, 1152, 1154.

In some embodiments, the overlay buttons can have shapes representative of the item being purchased. For example, overlay buttons 1140, 1142, 1144 could be in the shape of a cup, with each button having a different size, such that the user can, via haptic feedback, determine the appropriate button to be pressed for a drink. For example, button 1140 could be a small cup representing a smaller drink, button 1140 could be a medium cup representing a medium drink, and button 1144 could be a large cup representing a larger drink. Likewise, the overlay buttons 1150, 1152, 1154 could have a shape of a particular item, such as a burrito, an order of nachos, or a quesadilla. By providing overlay keys having particular shapes, this can aide a user of the computing device in more quickly performing tasks, whether or not the person is visually impaired.

In some embodiments, the overlay buttons can be color-coded for certain keys or buttons that are used in a frequent manner. Thus, the frequently used keys are readily accessible with a quick glance.

A special overlay button 1160 can be provided in the shape of a start, to indicate a significantly important button or other feature of the computing device. The placement, size, and shape of the overlay buttons are highly variable depending upon the display capabilities of the underlying computing device, the particular application being executed by the computing device, etc. It is also noted that the overlay buttons can be color-coded such that different buttons relate to different functions or different items. In this manner, a user can more readily locate particular buttons based upon their color scheme.

The features and advantages of providing a removable overlay should now be clear. The overlay should not be limited to the embodiments disclosed herein, but rather applicable to all devices having a touchscreen or flat-screen display.

Figure 12:
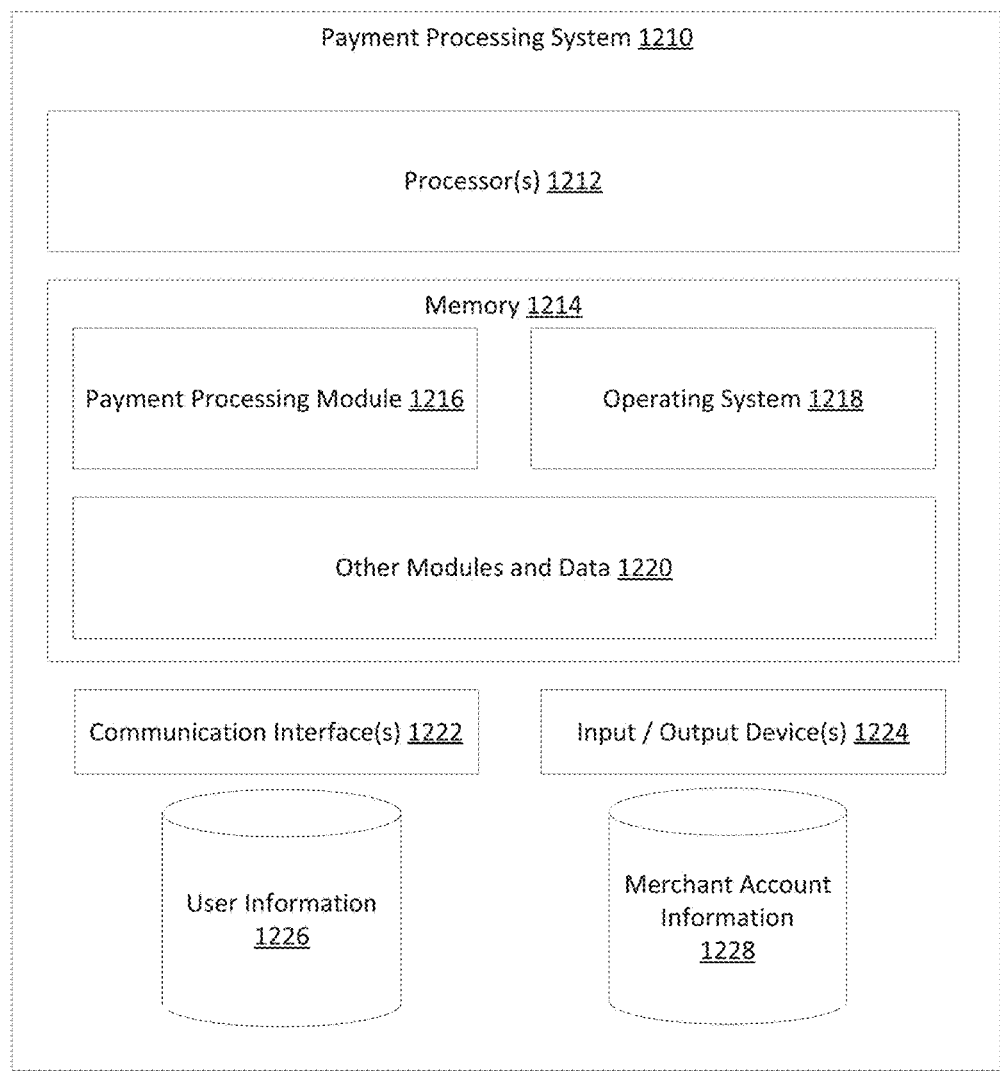
FIG. 12 illustrates an example block diagram of components of a payment processing system.

FIG. 12 is a block diagram illustrating select components of an example payment processing system 1210 according to some embodiments. The payment processing system 1210 can comprise the payment processing system 102 in an example embodiment. The payment processing system 1210 can be any suitable type of computing device capable of sending communications and performing the functions according to the techniques described herein and can be operated by a service provider that provides the payment processing service. For instance, in the case of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

The payment processing system 1210 enables a service provider to provide a payment service in which merchants are able to conduct POS transactions with a plurality of buyers, such as for selling services and/or products to the buyers. The payment processing system 1210 can include one or more processor(s) 1212 (or servers) that are configured to process secure electronic financial transactions, e.g., payment during a POS transaction, by communicating with the merchant device, card payment networks, and bank or other financial institution payment systems. The payment processing system 1210 includes a payment processing module 1216 that receives transaction information for processing payments made through the merchant application. For example, the payment processing module 1216 can receive transaction information, such as an amount of the transaction, and can verify that a particular payment card can be used to pay for the transaction, such as by contacting a card clearinghouse of a card payment network. Furthermore, in some examples, the payment processing module 1216 can redirect payment information for transactions to be made using payment cards to a bank, or other financial institution, payment system. In other embodiments, the merchant device can communicate directly with an appropriate card payment network or bank payment system for approving or denying a transaction using a particular payment card for a POS transaction.

As used herein, the term "payment card," "payment object," or "payment instrument" refers to a payment mechanism which includes a debit card, a conventional credit card, "smartcards" that have embedded circuits, such integrated circuit (IC) cards (e.g., Europay-MasterCard-Visa (EMV) cards), and NFC enabled payment cards, or any wallet-size card which functions as a combination of any of these payment mechanisms. In some embodiments, a payment card, payment object, or payment instrument can also include a virtual payment card stored on a device such as a smart phone or other device and transmittable, for example, via near field communication (NFC) or other suitable means.

As introduced above, the payment processing system 1210 can be configured to communicate with one or more systems of a card payment network (e.g., MasterCard®, VISA®, or the like) over the network to conduct financial transactions electronically. The payment processing system 1210 can also communicate with one or more bank payment systems of one or more banks over the network. For example, the payment processing system Z10 can communicate with an acquiring bank, a payment card issuing bank, and/or a bank maintaining buyer accounts for electronic payments.

A payment card acquiring bank can be a registered member of a card association (e.g., Visa®, MasterCard®, or the like), and can be part of a card payment network A payment card issuing bank can issue payment cards to buyers, and can pay acquiring banks for purchases made by cardholders to which the issuing bank has issued a payment card. Accordingly, in some embodiments, the systems of an acquiring bank can be included in the card payment network and can communicate with systems of a payment card issuing bank to obtain payment. Further, in some embodiments, bank payment systems can include systems associated with debit card issuing institutions, in which case, the systems of the debit card issuing institution can receive communications regarding a transaction in which the buyer uses a debit card instead of a credit card. Additionally, there can be systems of other financial institutions involved in some types of transactions or in alternative system architectures and thus, the foregoing are merely several examples.

Further, while the examples herein illustrate the components and data of the payment processing system 1210 as being present in a single location, these components and data can alternatively be distributed across different computing devices and different locations. Consequently, the functions can be implemented by one or more computing devices, with the various functionality described above distributed in various ways across the different computing devices, to collectively implement the payment processing system 1210. Multiple payment processing systems 1210 can be located together or separately, and organized, for example, as virtual servers, server banks and/or server farms. The described functionality can be provided by the servers of a single entity or enterprise, or can be provided by the servers and/or services of multiple different buyers or enterprises.

In the example of FIG. 12, the payment processing system 1210 includes one or more processors 1212, one or more memory devices 1214, one or more communication interfaces 1222, and one or more input/output devices 1224. These components can be similar to those described above with reference to FIG. 1 and elsewhere herein.

The memory 1214 can be used to store and maintain any number of functional components or modules that are executable by the processor 1212. In some embodiments, these functional components comprise instructions or programs that are executable by the processor 1212 and that, when executed; implement operational logic for performing the actions and services attributed above to the payment processing system 1210. Functional components of the payment processing system 1210 stored in the memory 1214 can include the payment processing module 1216, the operating system 1218, and other modules and data 1220. These components can be similar to those described with reference to FIG. 1 and elsewhere herein. In addition, the memory 1214 can store data used for performing the operations described herein. Thus, the memory 1214 can store merchant information 1226, including the merchant profiles. Further, the payment processing system 1210 can include many other logical, programmatic and physical components, of which those described above are merely examples that are related to the discussion herein.

For clarity of explanation, in some instances the present technology can be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system for facilitating engagement with a touch screen of a device, the system comprising:
   the touch screen configured to display a user interface including a soft button visual representation, and to detect a change in capacitance in a soft button region responsive to touch; and
   an overlay including:
   a top surface,
   a bottom surface,
   a tactile button disposed along the top surface of the overlay, the tactile button coupled to a button capacitive component disposed along the bottom surface of the overlay, wherein engagement of the tactile button results in the button capacitive component interacting with the touch screen in the soft button region to provide a capacitive input that is detectable by the touch screen, and one or more capacitive overlay locating elements other than the button capacitive component, the one or more capacitive overlay locating elements disposed along the bottom surface of the overlay, wherein the one or more capacitive overlay locating elements are detectable by the touch screen and are configured to thereby convey to the touch screen a position of the overlay along the touch screen and an orientation of the overlay relative to an orientation of the touch screen and a size of the overlay relative to a size of the touch screen, wherein an application executing at the device repositions and sizes the soft button region to underlie the tactile button of the overlay based on the position of the overlay along the touch screen and the orientation of the overlay relative to the orientation of the touch screen and the size of the overlay relative to the size of the touch screen.

2. The system of claim 1, wherein the one or more capacitive overlay locating elements include a plurality of capacitive components other than the button capacitive component disposed along the bottom surface of the overlay.

3. The system of claim 1, wherein the application executing at the device also repositions the soft button visual representation based on the repositioning of the soft button region.

4. The system of claim 1, wherein the one or more capacitive overlay locating elements convey to the touch screen a second position of the overlay along the touch screen and a second orientation of the overlay relative to the orientation of the touch screen after conveying to the touch screen the position of the overlay along the touch screen and the orientation of the overlay relative to the orientation of the touch screen and the size of the overlay relative to the size of the touch screen, wherein the application executing at the device repositions the soft button region again to underlie the overlay based on the second position of the overlay along the touch screen and the second orientation of the overlay relative to the orientation of the touch screen.

5. The system of claim 1, wherein the soft button visual representation is visible through the tactile button.

6. The system of claim 1, wherein the one or more capacitive overlay locating elements convey to the touch screen the orientation of the overlay relative to the orientation of the touch screen by conveying to the touch screen that the overlay is in a crooked orientation relative to the touch screen, wherein the application executing at the device repositions the soft button region to underlie the overlay based on the crooked orientation of the overlay relative to the touch screen.

7. A system for facilitating engagement with a touch screen, the system comprising:
the touch screen configured to display a soft button visual representation and to detect a change in capacitance in a soft button region corresponding to the soft button visual representation; and
an overlay positioned over the touch screen, the overlay including:
a tactile button of the overlay, the tactile button coupled to a button capacitive component of the overlay, wherein engagement of the tactile button results in the button capacitive component interacting with the touch screen in the soft button region to provide a capacitive input that is detectable by the touch screen, one or more overlay locating elements other than the button capacitive component, wherein the one or more overlay locating elements are detectable by the touch screen and are configured to thereby convey to the touch screen a position of the overlay along the touch screen and an orientation of the overlay relative to an orientation of the touch screen and a size of the overlay relative to a size of the touch screen, wherein the touch screen is configured to reposition the soft button region to underlie the tactile button of the overlay based on the position of the overlay along the touch screen and the orientation of the overlay relative to the orientation of the touch screen and the size of the overlay relative to the size of the touch screen.

8. The system of claim 7, wherein the one or more overlay locating elements convey to the touch screen the orientation of the overlay relative to the orientation of the touch screen by conveying to the touch screen that the overlay is in a crooked orientation relative to the touch screen.

9. The system of claim 7, wherein the tactile button is one of a liquid filled button or an air filled button.

10. The system of claim 7, wherein the tactile button is a push-button switch.

11. The system of claim 7, further comprising a merchant application configured to run on a mobile device that includes the touch screen, wherein the merchant application facilitates processing of payments between a buyer and a merchant.

12. The system of claim 7, further comprising a payment object reader, wherein the payment object reader includes at least one of a magnetic stripe card interface, an integrated circuit card interface, or a near field communication interface.

13. The system of claim 7, further comprising cutouts in the overlay configured to allow visibility of the soft button visual representation through the overlay.

14. A method for facilitating engagement with a touch screen, comprising:
detecting that an overlay is positioned on the touch screen, wherein the overlay includes a surface that faces the touch screen, wherein the overlay includes a tactile button that is coupled to a button capacitive component, wherein the button capacitive component is disposed along the surface of the overlay that faces the touch screen, wherein the surface of the overlay that faces the touch screen also includes one or more overlay locating elements other than the button capacitive component;
determining a position of the overlay along the touch screen and an orientation of the overlay relative to an orientation the touch screen and a size of the overlay relative to a size of the touch screen based on detection of the one or more overlay locating elements via the touch screen;
repositioning a soft button region along the touch screen based on the position of the overlay along the touch screen and the orientation of the overlay relative to the orientation of the touch screen and the size of the overlay relative to the size of the touch screen so the soft button region underlies the tactile button of the overlay;

displaying a visual representation of the soft button region in the soft button region on the touch screen after repositioning the soft button region; and detecting a capacitive input by the touch screen at the soft button region of the touch screen in response to an engagement of the tactile button, the engagement of the tactile button resulting in the button capacitive component of the overlay interacting with the touch screen in the soft button region to produce the capacitive input.

15. The method of claim 14, wherein the one or more overlay locating elements include one or more capacitive components other than the button capacitive component, and wherein determining the position of the overlay along the touch screen and the orientation of the overlay relative to the orientation of the touch screen and the size of the overlay relative to the size of the touch screen is accomplished at least by detecting one or more positions of the one or more capacitive components via the touch screen.

16. The method of claim 14, wherein the one or more overlay locating elements include one or more visual indicators, and wherein determining the position of the overlay along the touch screen and the orientation of the overlay relative to the orientation of the touch screen and the size of the overlay relative to the size of the touch screen is accomplished by detecting engagement with the one or more visual indicators by a finger of a user.

17. The method of claim 14, wherein determining the orientation of the overlay relative to the orientation of the touch screen includes determining that the overlay is in a crooked orientation relative to the touch screen.

18. The method of claim 14, further comprising:

determining that the overlay has been moved from the position of the overlay along the touch screen and the orientation of the overlay relative to the orientation of the touch screen;

determining a second position of the overlay along the touch screen and a second orientation of the overlay relative to the orientation of the touch screen by detecting the one or more overlay locating elements via the touch screen after determining that the overlay has been moved; and repositioning the soft button region along the touch screen again based on the second position of the overlay along the touch screen and the second orientation of the overlay relative to the orientation of the touch screen so that the soft button region underlies the tactile button of the overlay.

19. The method of claim 14, further comprising:

displaying, on the touch screen, an indication that the soft button region is active, and that a second region outside the soft button region is inactive.

20. The method of claim 14, further comprising:

entering a second touch screen interface mode from a first touch screen interface mode in response to detecting that the overlay is positioned on the touch screen.

* * * * *